(12) United States Patent
Mallet

(10) Patent No.: US 7,719,975 B2
(45) Date of Patent: May 18, 2010

(54) METHOD AND SYSTEM FOR COMMUNICATION SESSION UNDER CONDITIONS OF BANDWIDTH STARVATION

(75) Inventor: Jacqueline Mallet, Cambridge, MA (US)

(73) Assignee: Reqall, Inc., Moffett Field, CA (US)

( * ) Notice: Subject to any disclaimer, the term of this patent is extended or adjusted under 35 U.S.C. 154(b) by 386 days.

(21) Appl. No.: 11/552,927

(22) Filed: Oct. 25, 2006

(65) Prior Publication Data

US 2008/0101221 A1 May 1, 2008

(51) Int. Cl.
*H04L 1/00* (2006.01)
(52) U.S. Cl. .................................. 370/230; 709/231
(58) Field of Classification Search .................. None
See application file for complete search history.

(56) References Cited

U.S. PATENT DOCUMENTS

| | | | | |
|---|---|---|---|---|
| 6,343,313 B1 * | 1/2002 | Salesky et al. | ............... | 709/204 |
| 6,377,817 B1 * | 4/2002 | Hakaste et al. | ............ | 455/553.1 |
| 6,411,601 B1 * | 6/2002 | Shaffer et al. | ............... | 370/230 |
| 2002/0049852 A1 * | 4/2002 | Lee et al. | .................... | 709/231 |
| 2006/0029093 A1 * | 2/2006 | Van Rossum | ............... | 370/432 |
| 2006/0167985 A1 * | 7/2006 | Albanese et al. | ............ | 709/203 |
| 2007/0008403 A1 * | 1/2007 | Huang et al. | ............. | 348/14.04 |
| 2007/0165555 A1 * | 7/2007 | Deng et al. | ................. | 370/318 |

* cited by examiner

*Primary Examiner*—Huy D Vu
*Assistant Examiner*—Benjamin Lamont
(74) *Attorney, Agent, or Firm*—Sonnenschein Nath & Rosenthal LLP

(57) ABSTRACT

A real-time communication device with an asymmetric mode is disclosed. During a real-time communication session, a communication application executing on the communication device detects an upstream communication channel having insufficient bandwidth to support real-time communications in an upstream direction. Consequently, the communication application enters into an asymmetric mode. In asymmetric mode, as the communication application continues to receive data over a downstream communication channel, the communication application allows a user to record a media clip, and communicate the media clip to a remote communication device over the upstream communication channel at a transfer rate supported by the available bandwidth of the upstream communication channel. Once the media clip is received at the remote communication device, the local communication application facilitates sending a signal to the remote communication device instructing the remote communication device to play the media clip at the remote communication device.

24 Claims, 3 Drawing Sheets

METHOD AND SYSTEM FOR COMMUNICATION SESSION UNDER CONDITIONS OF BANDWIDTH STARVATION

FIELD OF THE INVENTION

The present invention relates generally to methods and systems for enabling voice communications over data network systems. In particular, the present invention relates to computer-implemented methods and systems for enabling audio and/or video communications over data networks that are characterized as having a bandwidth limitation in one or both directions.

BACKGROUND

Successful communication of real-time voice or video calls over a data network requires a minimum bandwidth, and latency, in both directions such that the data network is capable of transmitting the voice and/or video data without undue delay, or interruption. If sufficient bandwidth is not available, call quality can easily become distorted to the point of being unintelligible. It is often the case that this bandwidth insufficiency occurs in one direction only, a condition known as asymmetric bandwidth starvation, either because of varying network loads, or because the local access point has been engineered to provide asymmetric connections. This is often done deliberately as a cost saving, to take advantage of the reality that the network load of many network-based applications is in fact asymmetrical. For example, web pages have a very small uplink requirement (e.g., the page reference to URL) in proportion to their download requirement (e.g., the web page itself).

In the presence of an asymmetric network connection, the user of a real-time voice over data application (e.g., Voice over Internet Protocol, or VOIP) application) may well experience perfect audio in one direction, and unintelligible audio in the other. Similarly, a video application may receive and present video smoothly, but send video such that is choppy when played at the remote device. However, there is still bandwidth available to transmit the audio or video, just not enough of it to perform this in real time as required for the voice or video over data application.

SUMMARY OF THE DESCRIPTION

According to one embodiment of the invention, during a real-time communication session, a communication application executing on a communication device detects an upstream communication channel having insufficient bandwidth to support real-time communications in an upstream direction. Consequently, the communication application enters into an asymmetric mode. In asymmetric mode, as the communication application continues to receive data over a downstream communication channel, the communication application allows a user to record a media clip, and communicate the media clip to a remote communication device over the upstream communication channel at a transfer rate supported by the available bandwidth of the upstream communication channel. Once the media clip is received at the remote communication device, the local communication application facilitates sending a signal to the remote communication device instructing the remote communication device to play the media clip at the remote communication device. Other aspects of the invention are presented below in connection with the description of the figures.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DESCRIPTION

Figure 1:
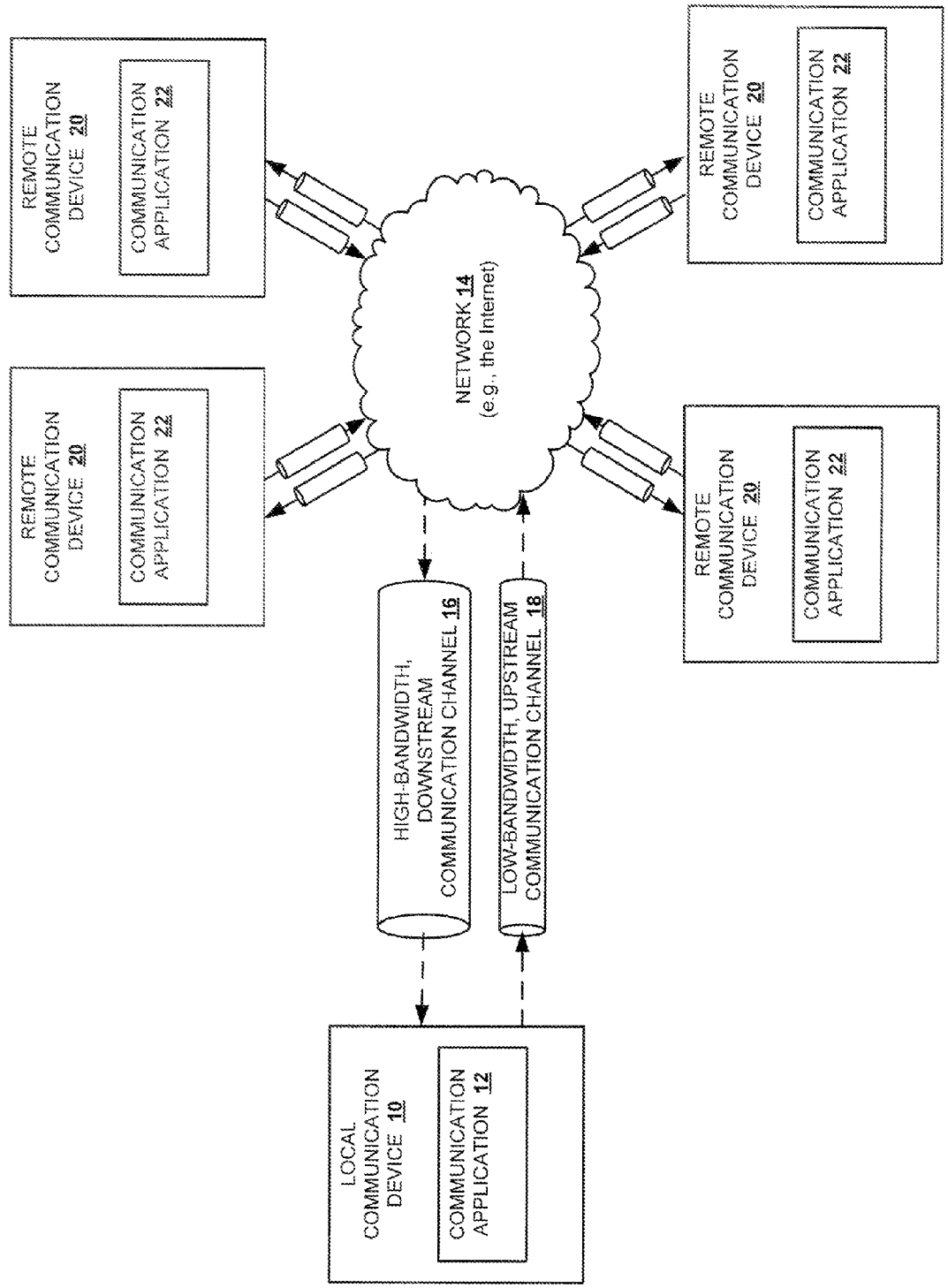
FIG. 1 illustrates an example of a local communication device, consistent with an embodiment of the invention, executing a communication application, which is communicatively coupled to a network over a high-bandwidth, downstream communication channel and a low-bandwidth, upstream communication channel.

Reference will now be made in detail to an implementation consistent with the present invention a illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description.

Throughout this description, the terms "local" and "remote" are used to describe communication devices. It will be appreciated by those skilled in the art that these terms are used in their conventional manner to provide perspective from the standpoint of a particular user of a particular communication device. Accordingly, a device that is local to one user may be remote to another user. Similarly, as used herein to describe the directional flow of data on a communication channel connecting two communication devices, the terms "upstream" and "downstream" are to be interpreted in relation to a particular device. Accordingly, a communication channel that is described as "upstream" from the standpoint of a local communication device is a "downstream" communication channel from the standpoint of a remote communication device. Furthermore, many of the examples described herein are provided in the context of two or more persons participating in a teleconference established between communication devices that are executing audio or voice applications (e.g., Voice over Internet Protocol, or VOIP applications. Although the present invention is particularly applicable in the context of audio communication applications where a voice signal is encapsulated in a series of data packets, such as VOIP communication applications, it will be appreciated by those skilled in the art that the invention is applicable in other contexts as well. For example, in addition to voice applications, the present invention may be implemented with video conferencing applications. For that matter, the present invention may be implemented with any communication system that is dependent on real-time continuous communication at a minimum bandwidth, wherein data packets can be communicated at a slower rate, and used in real time at the receiving end on user command/control.

Consistent with an embodiment of the invention, a real-time communication application executing on a communication device is configured to operate in an asymmetric mode. The asymmetric mode may be entered automatically, for example, when the communication application detects insufficient bandwidth to support real-time communications over an upstream communication channel. Alternatively, a user may manually select to enter asymmetric mode. In any case, when operating in asymmetric mode, the communication device sends or receives data in real time over one communication channel, and in non-real time over the other communication channel. For example, in asymmetrical mode, a communication device may receive voice data from remote communication devices in real time on a downstream communication channel, thereby allowing a participant in a teleconference call to hear other participants. At any time in order to contribute to the teleconference from a device operating in asymmetric mode, a participant can record a voice message, which can then be communicated to other participants on the upstream channel at a rate suitable to the available bandwidth. Once the voice message has been received by the remote communication devices of the other participants, the originating participant can select when the message is to be played or presented to the other participants. Accordingly, the originating participant's communication device sends a signal instructing the communication devices of the other participants to play back the previously received recorded message. Other aspects of the invention are described in greater detail below in connection with the description of the figures.

FIG. 1 illustrates an example of a local communication device 10, consistent with an embodiment of the invention, executing a communication application 12, which is communicatively coupled to a network 14 over a high-bandwidth, downstream communication channel 16 and a low-bandwidth, upstream communication channel 18. The network 14 may be a public data network (e.g., the Internet) or a private data network. The characteristics of the network connection connecting the local communication device 10 to the network 14 are typical of an asymmetrical digital subscriber line (ADSL) connection—a type of network connection commonly used for connecting personal computers in homes and small offices to the Internet. Accordingly, the bandwidth available for data traveling in the downstream direction exceeds the bandwidth available to data traveling in the upstream direction. It will be appreciated by those skilled in the art that a connection may be asymmetric by design, such as with an ADSL connection. Alternatively, an asymmetric condition may exist when there is significant data traffic on a segment of the network, and only a small portion is dedicated to the communication application 12. As will be described in greater detail below, when operating in asymmetric mode, the communication application 12 will receive data from communication applications 22 executing on other communication devices 20 in real time on the high-bandwidth, downstream communication channel 16, and send data to the other communications devices 20 in non-real time over the low-bandwidth, upstream communication channel 18.

Figure 2:
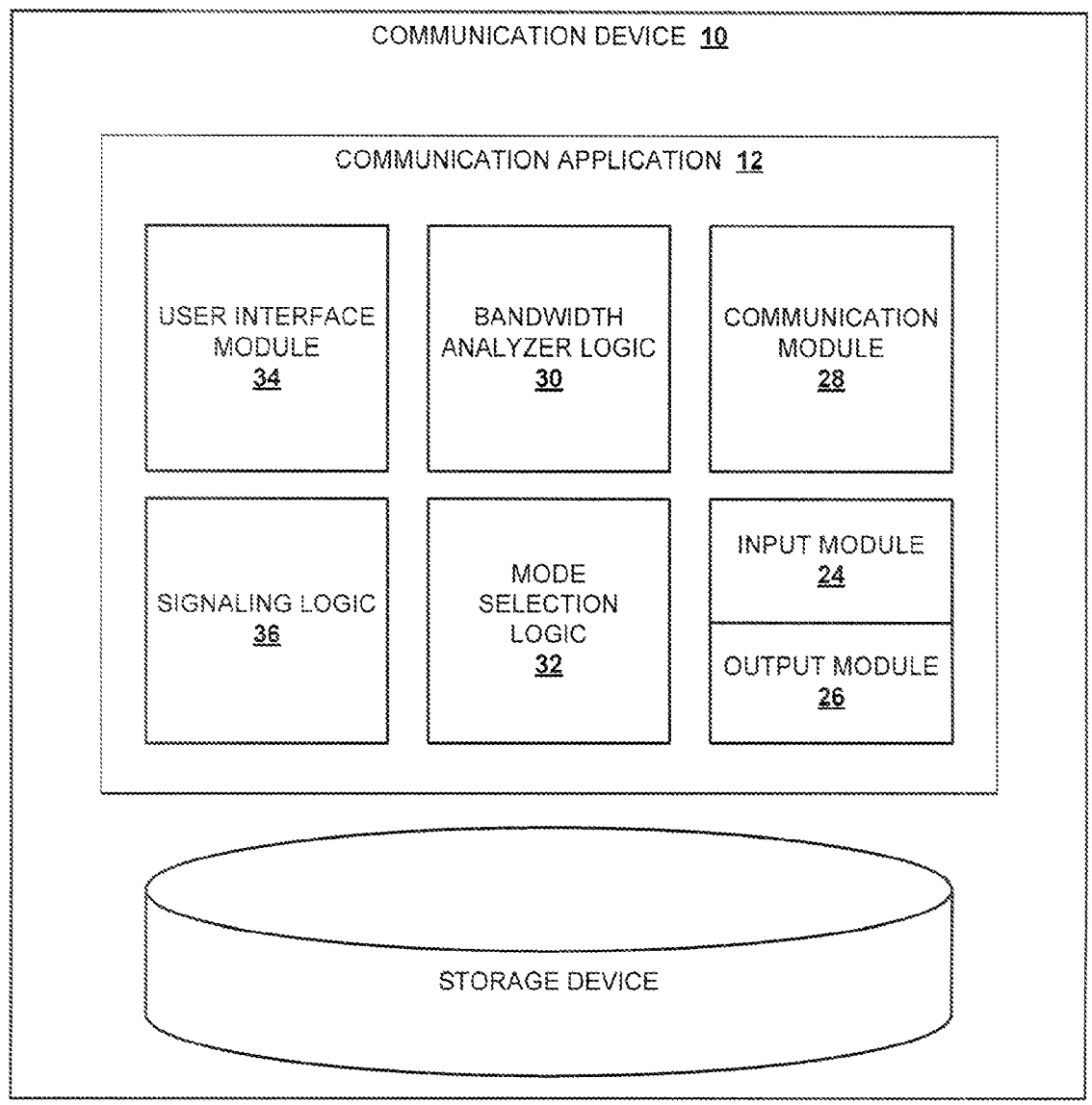
FIG. 2 illustrates a functional block diagram of a communication device according to an embodiment of the invention.

FIG. 2 illustrates a functional block diagram of a communication device 10 according to an embodiment of the invention. In various embodiments of the invention, a communication device 10 may take on one of a variety of form factors. For example, the local communication device 10 may be a general purpose computing device, such as a personal computer (desktop, laptop or notebook) or personal digital assistant (PDA). Alternatively, the communication device 10 may be a dedicated communication device, such as a mobile or handheld phone. Accordingly, certain communication components, such as a microphone and/or a speaker, may be internal to the communication device—as is typical with a mobile phone—or external, such as with a personal computer. Furthermore, it will be appreciated by those skilled in the art that the functional or logical blocks illustrated in FIG. 2 may be implemented in hardware, software, or a combination thereof.

As illustrated in FIG. 2, the communication application 12 includes an input module 24 as well as an output module 26. Accordingly, the input and output modules facilitate recording and presenting media clips (e.g., audio and/or video signals) for two-way real-time communications. For example, in one embodiment of the invention, the communication application 12 is a Voice over Internet Protocol (VOIP) application, and the input module 24 receives an audio signal from an internal or external microphone (not shown). If the communication application 12 is a video conferencing application, the input module 24 may receive a video signal from an internal or external video camera device in addition to an audio signal from a microphone. The input module 24 may also receive user input from other user interface devices, such as a keyboard, dial pad, or pointing device (e.g., mouse, or touch sensitive display). The output module 26 facilitates the presentation or play back of audio and/or video signals on one or more output devices. For example, the output module 26 may direct audio signals to an internal or external speaker. Similarly, the output module 26 may facilitate the presentation or play back of video signals on an internal or external display or monitor.

In one embodiment of the invention, when operating in asymmetric mode, various input modes may be selected. For example, a user may select to indicate the beginning and/or ending portions of an audio/video recording by pressing or selecting a user interface object of the communication application 12. Alternatively, a user may select an automated mode such that the communication application 12 automatically detects and records a media clip based on detection of speech, with no other user interaction required.

The communication application 12 also includes a communication module 28. In one embodiment of the invention, the communication module 28 facilitates the sending and receiving of data packets over a packet-switched network (wired or wireless). For example, in a VOIP application, the communication module 28 receives audio data from the input module 24 and converts the audio data by properly formatting the audio data into the data packets to be sent over a network. The data packets may be formatted to be consistent with one or more standardized networking or communication protocols to include UDP, TCP/IP, etc., or a proprietary protocol. Similarly, the communication module 28 receives data packets from other communication devices over a network, and prepares the data packets to be presented by the output module 26. The communication module 28 may include encoding and decoding algorithms, as well as encryption and decryption algorithms for secure communications sessions.

Referring again to FIG. 2, in one embodiment of the invention, the communication application 12 includes bandwidth analyzer logic 30 to analyze the bandwidth available to the communication application 12. Specifically, the bandwidth analyzer logic 30 analyzes the available bandwidth to determine when there is insufficient bandwidth to support sending or receiving real-time data over a particular communication channel in connection with a real-time communications sessions. For example, if the bandwidth analyzer logic 30 determines there is insufficient bandwidth in the upstream direction, the communication device 10 may automatically enter asymmetric mode, or alternatively, the communication device 10 may notify the user of the bandwidth limitation, and then provide the user with an option to enter asymmetric mode. Similarly, if the bandwidth analyzer logic 30 determines there is insufficient bandwidth in the downstream direction, the signaling logic 36 of the communication device 10 may communicate a signal to one or more remote communication devices notifying the remote communication devices about the bandwidth problem. Accordingly, a remote communication device may, upon receiving such a signal, notify a remote user of the bandwidth limitation and provide the remote user with an option to enter into asymmetric mode.

The bandwidth analyzer logic 30 may use any of a variety of conventional and well-known mechanisms for measuring, and determining the sufficiency of, the available bandwidth. For example, in one embodiment of the invention, bandwidth measurements may be based on the time it takes for one or more data packets to make a round trip between the originating communication device and a remote communication device, or other network connected server. In one embodiment of the invention, the bandwidth analyzer logic 30 continuously measures and monitors the available bandwidth, so that changing network conditions can be detected and accommodated. Accordingly, it is possible that a communication device may automatically switch between a real-time mode an asymmetric mode as network conditions change.

In one embodiment of the invention, the communication application 12 includes mode selection logic 32. The mode selection logic 32 may automatically change the operating mode of the communication device 10 to an asymmetric mode when the bandwidth analyzer logic 30 determines there is insufficient bandwidth to support real-time communications. When this occurs, the communication device may provide a visual or audible alert to notify the user that the mode has changed. In addition, the user interface module 28 and the mode selection logic 26 may work in conjunction with one another to allow a user to manually change the operating mode to asymmetric mode. For example, the user interface module 28 may provide a user interface object, such as a selectable button, icon or other graphic, which enables the user to manually select an asymmetric operating mode. Accordingly, a user may choose to enter asymmetric mode when there is sufficient bandwidth for real-time communications. Similarly, when the bandwidth analyzer logic 30 determines there is insufficient bandwidth for real-time communications, a user may be provided an option to enter into asymmetric mode.

When the communication application 12 is operating in asymmetric mode due to insufficient bandwidth on an upstream communication channel, the communication application 12 enables a user to record a media clip to be sent over the upstream communication channel in non-real time. For example, in asymmetric mode, a user of the communication device 10 will be able to receive communications over the downstream channel in real-time. This allows a user to hear a conversation or see a video from a video conferencing session in real-time. When the user wants to participate, for example, by adding to the conversation, the user records a media clip (e.g., audio and/or video message), which is uploaded to the remote communication device in non-real time. The user can then trigger the playback of the media clip at the remote communication device at an appropriate time by signaling the remote communication device. Consequently, although the bandwidth limitation prevents real-time communications, a user is able to control the playback of media clips at one or more remote communication devices in real time.

In one embodiment of the invention, the communication application 12 includes signaling logic 36 to receive and generate control signals that control when a previously received media clip is to be presented at a remote communication device 20. For example, once a media clip has been received at a remote communication device 20, a signal is generated by the remote communication device 20 and sent to the local communication device 10 to indicate that the media clip has been received. Accordingly, in response to user input, the signaling logic 36 of the local communication device 10 generates a signal to instruct the remote communication device 20 to play the media clip. In this way, the user can control the timing of the play back so that the media clip is presented at a time appropriate in the context of the conversation, such as when there is a break in the conversation.

In the context of a multi-user real-time conferencing application, the signaling process may be more complex. For example, in a multi-user conferencing application or mode, one communication device may serve as a centralized communications session manager. Accordingly, a local communication device operating in asymmetric mode may send a media clip to the centralized session manager, and the centralized session manager may distribute the media clip to each remote communication device participating in the communication session. After each participating communication device has received the media clip, each participating communication device signals the centralized session manager, which in turn, signals the originating local communication device. Accordingly, the local communication device then sends the centralized session manager a signal to indicate when the media clip is to be played, and the centralized session manager distributes the signal in real time to the participating remote communication devices.

The user interface module 34 controls the generation and enabling user interface objects. For instance, the user interface module may generate or enable a user interface object indicating the particular operational mode of the communication device. The user interface object may indicate what channel (e.g., upstream or downstream) is operating in asymmetric mode. Consequently, a user at a remote communication device will know that another user may not be able to communicate in real time.

In one embodiment, the user interface module 34 generates a user interface object that enables the user to control when a media clip is presented or played on a remote communication device. For example, after a media clip has been received at a remote communication device, the local communication device may present a button for playing the media clip. When the button is pressed, a signal is generated to instruct the remote communication device or device to play the previously received media clip.

Those skilled in the art will appreciate that a user interface object may be a physical button, such as a button on a keypad of a phone, or a button, icon, graphic or other such indicator that is displayed on a communication device's display. The user interface object may be a user selectable object, such as a physical button or graphic button. Accordingly, if the communication device 10 is a general purpose computer, the user interface object may be a button, icon or graphic that is displayed in a user interface window associated with the communication application. If the communication device 10 is a dedicated communication device, such as a mobile phone, the user interface object may be a button, icon or graphic displayed on the communication device's display (e.g., liquid crystal display (LCD)). Alternatively, the user interface object may be as simple as a light (e.g., light emitting diode (LED)) that is activated on the communication device 10 to notify the user that the communication application 12 has automatically entered asymmetric mode.

In one embodiment of the invention, the user interface module 34 indicates the status of recorded media clips to the originating use and/or the receiving user. For example, after a media clip has been recorded, the user interface module 34 may present a graphical representation of the media clip indicating how much of the media clip has been transmitted to a remote communication device. Similarly, the user interface module of a remote communication device may display a graphical representation of a received media clip indicating such attributes as the size, length, and/or source of the media clip. The user interface module 34 may also present a user with one or more user interface objects (e.g., buttons, icons, or other graphics) that enable the user to control certain aspects of the media clip. For example, an originating user may be able to select or control the destination of a media clip such that only a subset of the available communication devices participating in a real time communications session receives a particular media clip. Similarly, an originating user may be able to delete a media clip from local or remote storage prior to play back, either before or after the media clip has been sent to a remote communication device. For example, in the case where a media clip has already been sent to a remote communication device, the signaling logic 36 generates the necessary signaling to instruct the remote communication device or devices to delete the media clip from storage. In one embodiment, remote users are unable to control the play back of media clips received from other users. However, in an alternative embodiment, both an originating and receiving user may be able to control aspects (such as play back) of media clips.

In one embodiment of the invention, a user can record several media clips, and the user interface module 34 provides the user with options as to whether each individual media clip should be sent to one or more remote communication devices during a teleconference or videoconference call. For example, the user interface module 34 may have several graphical buttons, or a drop down menu, enabling a user to take one of several actions with respect to any one of a plurality of media clips that have been recorded during a real-time conference. The user interface module 34 may prompt a user to select whether a particular media clip should be sent. Furthermore, in one embodiment, a pre-recorded media clip may be communicated from the local communication device to one or more remote communication devices. For example, a user may record a clip in anticipation of a future conference call. Then, during the conference call, the user interface module 34 may facilitate selecting the pre-recorded media clip to be communicated to one or more remote communication devices.

In addition to enabling a user to select one of multiple media clips to send, in one embodiment, after multiple clips have been sent, the user interface module 34 enables a user to select which of the multiple media clips should be played. For example, a user may have several questions that he or she would like to ask during a conference call. Accordingly, the user may record and send several media clips—one for each question. Then, during the conference call, the user can select to have only those questions that are not answered played at the remote communication devices. Accordingly, the user may choose to delete those media clips that are not to be played.

In one embodiment of the invention, the communication application 12 analyzes the size of a media clip and the rate at which a media clip is sent to a remote communication device in order to determine when the media clip can be presented at a remote communication device without interruption. For example, in one embodiment of the invention, the local communication device 10 allows a user to signal a remote communication device 20 instructing the remote communication device 20 to begin playing back the media clip prior to the entire media clip being received at the remote communication device. If enough of the media clip has been sent, such that play back of the media clip can be achieved without interruption, the local communication device may enable a user interface object allowing the user to signal the remote communication device to begin play back prior to the entire media clip being received at the remote communication device.

Figure 3:
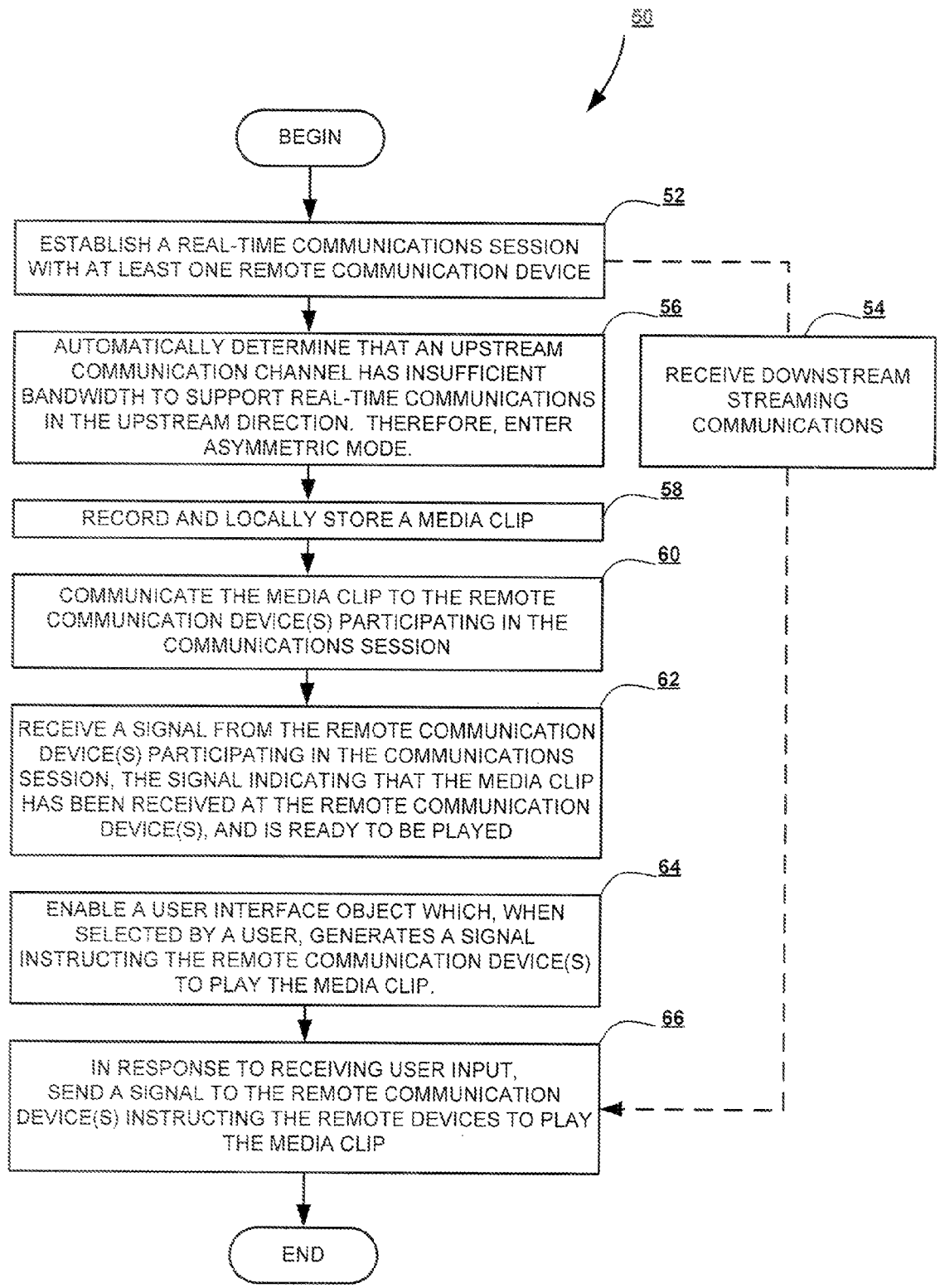
FIG. 3 illustrates a method, according to an embodiment of the invention, for communicating in a real-time communication session in asymmetric mode.

FIG. 3 illustrates a computer-implemented method, according to an embodiment of the invention, for communicating in a real-time communication session in asymmetric mode. As illustrated in FIG. 3, the method begins at operation 52 when a communication application establishes a real-time communication session between two or more communication devices. Once the communication session has been established, the communication device may receive real-time data from one or more of the other remote communication devices. This is shown in FIG. 3 as occurring in parallel at operation 54.

In one embodiment of the invention, the communication application 12 will automatically analyze the bandwidth available for sending data on an upstream channel. Accordingly, at operation 56, the communication application 12 automatically determines that there is insufficient bandwidth available to support real-time communications in the upstream direction. Consequently, the communication application 12 enters asymmetric mode. In an alternative embodiment, a user may manually select to enter into asymmetric mode.

In any case, at operation 58 the communication application records and temporarily stores a media clip to be communicated over the upstream channel at a rate supported by the available bandwidth of the upstream channel. At operation 60, the communication module 28 sends the locally recorded and stored media clip to the one or more remote communication devices 20 participating in the real-time communications session.

When the remote communication devices receive the media clip, the remote communication devices do not automatically present or play back the media clip. Instead, the remote communication devices store the media clip, and send a signal back to the local communication device to indicate that the media clip has been received. Accordingly, at operation 62 the local communication device receives a signal from the one or more remote communication devices participating in the real-time communications session. The signal indicates that the remote communication devices have received the media clip and the media clip is ready to be presented or played back.

At operation 64, the communication device enables a user interface object, such as a button. At operation 66, in response to a user selecting the user interface object, the communication device sends a signal to the remote communication device or devices, instructing the remote communication device or devices to play the media clip. As described previously, in the case of a multi-user conferencing session, a centralized communications sessions manager may handle the actual signal distribution.

Although the present invention will be particularly useful in cases when network conditions exhibit asymmetric bandwidth starvation, the present invention might also be used when bandwidth is plentiful in both directions, or when bandwidth is limited in both directions. For example, in one embodiment of the invention, two or more users may communicate with communication devices operating in a non-real time mode. Accordingly, each user will communicate media clips to one or more other users in non-real time.

However, each user will, via the communication device's signaling logic 36, control in real-time when media clips are presented at each remote communication device.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. Finally, the illustrative processing steps performed by a computer-implemented program (e.g., instructions) may be executed and simultaneously, or in a different order than described above, and additional processing steps may be incorporated. The invention may be implemented in hardware, software, or a combination thereof. The scope of the invention is defined by the claims and their equivalents.

What is claimed is:

1. A method comprising:
    detecting, with a local communication device, an upstream communication channel having a bandwidth insufficient to support real-time communications in an upstream direction to a remote communication device during a real-time communications session,
    recording a media clip, using the local communication device, upon detection that the upstream communication channel has insufficient bandwidth to support real-time communication, while the real-time communication session is supported on a downstream channel;
    communicating the media clip from the local communication device to the remote communication device over the upstream communication channel at a transfer rate supported by the bandwidth of the upstream communication channel; and
    sending a signal from the local communication device to the remote communication device, said signal instructing the remote communication device to play the media clip.

2. The method of claim 1, wherein communicating the media clip to a remote communication device over the upstream communication channel includes instructing the remote communication device to store the media clip until such time as a signal is received instructing the remote communication device to play the media clip.

3. The method of claim 1, further comprising:
    responsive to receiving a signal from the remote communication device indicating the media clip has been received at the remote communication device, providing an audible or visual alert to notify a user that the media clip has been received at the remote communication device.

4. The method of claim 1, wherein, upon receiving the media clip, the remote communication device provides an audible or visual alert to notify a remote user that the media clip has been received at the remote communication device.

5. The method of claim 1, further comprising:
    responsive to receiving a signal from the remote communication device indicating the media clip has been received at the remote communication device, enabling a user interface object, wherein selection of the user interface object results in sending the signal to the remote communication device instructing the remote communication device to play the media clip at the remote communication device.

6. The method of claim 1, further comprising:
    determining the size of the media clip and a transfer rate at which the media clip is transferred to the remote communication device on the upstream communication channel; and
    responsive to predicting, based in part on the size of the media clip and the transfer rate, that enough of the media clip has been received at the remote communication device to allow uninterrupted play back of the media clip, enabling a user interface object, wherein selection of the user interface object results in sending the signal to the remote communication device instructing the remote communication device to play the media clip at the remote communication device.

7. The method of claim 1, wherein the real-time communications session is a Voice over Internet Protocol (VOIP) communications session, and the media clip is encoded based on a standard consistent with one or more VOIP protocols.

8. The method of claim 1, wherein the real-time communications sessions is a video conferencing session, and the media clip includes both video and audio signals.

9. A communication device comprising:
    bandwidth analyzer logic on a local communication device to detect an upstream communication channel having insufficient bandwidth to support real-time communications in an upstream direction to a remote communication device during a real-time communication session;
    an input module on the local communication device to record a media clip, when the input module detects the upstream communication channel has insufficient bandwidth to support real-time communication while the real-time communication session is supported on a downstream channel;
    a communication module on the local communication device to communicate the media clip to the remote communication device over the upstream communication channel at a transfer rate supported by the bandwidth of the upstream communication channel during the real time communication session; and
    a user interface module for the local communication device to enable a user interface object, wherein selection of the user interface object by a user causes signaling logic to send a signal to the remote communication device, said signal instructing the remote communication device to play the media clip.

10. The communication device of claim 9, wherein, upon detecting an upstream communication channel having insufficient bandwidth to support real-time communications, the signaling logic is configured to communicate a first signal to the remote communication device instructing the remote communication device to store media clips received from the communication device until such time as a second signal is received at the remote communication device instructing the remote communication device to play a media clip.

11. The communication device of claim 9, wherein, upon receiving a signal from the remote communication device indicating a media clip has been received at the remote communication device, the user interface component is configured to provide an audible or visual alert to notify a user that the media clip has been received at the remote communication device.

12. The communication device of claim 9, wherein, responsive to receiving a signal from the remote communication device indicating the media clip has been received at the remote communication device, the user interface component is configured to enable a user interface object, wherein selection of the user interface object causes the signaling logic to send a signal to the remote communication device instructing the remote communication device to play the media clip at the remote communication device.

13. The communication device of claim 9, wherein the bandwidth analyzer logic is configured to determine the size of the media clip and a transfer rate at which the media clip is transferred to the remote communication device on the upstream communication channel, and responsive to predicting, based in part on the size of the media clip and the transfer rate, that enough of the media clip has been received at the remote communication device to allow uninterrupted play back of the media clip, enabling a user interface object, wherein selection of the user interface object results in sending the signal to the remote communication device instructing the remote communication device to play the media clip at the remote communication device.

14. The communication device of claim 9, wherein the real-time communications session occurs over a packet-switched data network.

15. The communication device of claim 9, wherein the real-time communications session is a Voice over Internet Protocol (VOIP) communications session, and the media clip is encoded based on a standard consistent with one or more VOIP protocols.

16. The communication device of claim 9, wherein the real-time communications sessions is a video conferencing session, and the media clip includes both video and audio signals.

17. A method comprising:
while receiving, with a local communication device, a real-time data stream over a downstream communication channel of a packet-switched network, entering into an asymmetric communication mode in response to a manual input from a user of the local communication device;
recording a data clip to be communicated to a remote communication device over an upstream communication channel upon detection that the upstream communication channel has insufficient bandwidth to support real-time communications in an upstream direction during a real-time communications session; and
enabling a first user interface object so as to enable a user to send the data clip to the remote communication device in non-real time over the upstream communication channel of the packet-switched network by selecting the first user interface object.

18. The method of claim 17, further comprising:
enabling a second user interface object so as to enable the user of the local communication device to instruct the remote communication device to play the data clip at the remote communication device.

19. The method of claim 17, wherein the remote communication device, upon receiving the data clip, enables a second user interface object so as to enable a remote user to play the data clip at the remote communication device.

20. The method of claim 17, further comprising:
recording a plurality of data clips, and for each data clip, enabling an associated user interface object so as to enable the user of the local communication device to send any one of the data clips in non-real time over the upstream communication channel to the remote communication device by selecting a user interface object associated with a particular data clip.

21. The method of claim 17, further comprising:
recording a plurality of data clips, and for each data clip, providing a graphical representation of the data clip along with a selectable user interface object so as to enable the user of the local communication device to send any one of the plurality of data clips in non-real time over the upstream communication channel to the remote communication device by selecting the selectable user interface object associated with a particular data clip.

22. The method of claim 17, further comprising:
enabling a plurality of user interface objects, each user interface object associated with a data clip that has been communicated to a remote device; and
upon detecting selection of a particular user interface object associated with a particular data clip that has been communicated to the remote device, generating a signal to instruct the remote communication device to play the particular data clip at the remote device.

23. The method of claim 17, further comprising:
enabling a plurality of user interface objects, each user interface object associated with a data clip that has been communicated to a remote device; and
upon detecting selection of a particular user interface object associated with a particular data clip that has been communicated to the remote device, generating a signal to instruct the remote communication device to delete the particular data clip at the remote device.

24. The method of claim 17, further comprising:
enabling a user interface object associated with a previously recorded data clip, recorded prior to initiation of a real-time communication session; and
upon detecting a selection of the user interface object, sending the previously recorded data clip to one or more remote communication devices participating in the real-time communication session over the upstream communication channel.

* * * * *